(12) United States Patent
Alexander et al.

(10) Patent No.: US 10,778,737 B2
(45) Date of Patent: Sep. 15, 2020

(54) LIVE-STREAMING FLASHLIGHT CAMERA

(71) Applicant: Maguider, Inc., Brighton, MI (US)

(72) Inventors: David Christopher Alexander, Brighton, MI (US); Nicholas Peters, Whitmore Lake, MI (US)

(73) Assignee: MAGUIDER, INC., Brighton, MI (US)

( * ) Notice: Subject to any disclaimer, the term of this patent is extended or adjusted under 35 U.S.C. 154(b) by 250 days.

(21) Appl. No.: 15/915,317

(22) Filed: Mar. 8, 2018

(65) Prior Publication Data

US 2018/0262545 A1 Sep. 13, 2018

Related U.S. Application Data

(60) Provisional application No. 62/468,747, filed on Mar. 8, 2017.

(51) Int. Cl.
| | |
|---|---|
| *H04L 29/06* | (2006.01) |
| *H04N 5/225* | (2006.01) |
| *H04M 1/725* | (2006.01) |
| *H04W 4/80* | (2018.01) |
| *H04W 84/18* | (2009.01) |
| *H04W 76/14* | (2018.01) |
| *F21V 23/04* | (2006.01) |
| *F21V 33/00* | (2006.01) |

(Continued)

(52) U.S. Cl.
CPC .......... *H04L 65/4069* (2013.01); *F21L 4/005* (2013.01); *F21V 23/0414* (2013.01); *F21V 33/0052* (2013.01); *G03B 15/03* (2013.01); *H04L 65/1069* (2013.01); *H04M 1/7253* (2013.01); *H04N 5/2256* (2013.01); *H04N 5/2257* (2013.01); *H04W 4/80* (2018.02); *F21Y 2105/18* (2016.08); *F21Y 2115/10* (2016.08); *G03B 2206/00* (2013.01); *G03B 2215/0503* (2013.01); *G03B 2215/0567* (2013.01); *G03B 2215/0575* (2013.01); *G03B 2217/007* (2013.01); *H04W 76/14* (2018.02); *H04W 84/18* (2013.01)

(58) Field of Classification Search
CPC .. H04L 65/4069; H04L 65/1069; H04W 4/80; H04W 76/14; H04N 5/2256; G03B 15/03
USPC ........................................................ 709/219
See application file for complete search history.

(56) References Cited

U.S. PATENT DOCUMENTS

| | | |
|---|---|---|
| 7,646,973 B2 | 1/2010 | Howard et al. |
| 7,903,140 B2 | 3/2011 | Metala et al. |

(Continued)

OTHER PUBLICATIONS

Website www.ragecams.com/shop/fire-fighter-flashlight-helmet-camera-blackjack-video-p-634.html Retrieved from the Internet on May 9, 2016, 10 pgs.

(Continued)

*Primary Examiner* — Minh Chau Nguyen
(74) *Attorney, Agent, or Firm* — Brooks Kushman P.C.

(57) ABSTRACT

A live-streaming flashlight camera includes a camera adapted to capture an image of an object, a light source adapted to illuminate the object to be captured by the camera, a battery connected to provide power to the camera and light source, and a processor in communication with the light source and camera and configured to: establish an ad-hoc wireless network connection with a mobile host device, and livestream the image of the object to the mobile host device via the ad-hoc network connection.

20 Claims, 7 Drawing Sheets

(51) Int. Cl.
  *F21L 4/00* (2006.01)
  *G03B 15/03* (2006.01)
  *F21Y 105/18* (2016.01)
  *F21Y 115/10* (2016.01)

(56) References Cited

U.S. PATENT DOCUMENTS

| | | |
|---|---|---|
| 8,054,182 B2 | 11/2011 | Cutchis |
| 8,902,315 B2 | 12/2014 | Fisher et al. |
| 9,282,297 B2 * | 3/2016 | Siann .................... H04N 7/183 |
| 2006/0125918 A1 | 6/2006 | Sutton |
| 2014/0368601 A1 * | 12/2014 | deCharms ............. H04W 4/021 |
| | | 348/14.02 |
| 2016/0173816 A1 * | 6/2016 | Huenerfauth ...... H04N 5/23206 |
| | | 348/14.02 |
| 2017/0150020 A1 | 5/2017 | Edwards et al. |
| 2018/0088595 A1 * | 3/2018 | Bostick .................. G06Q 50/14 |

OTHER PUBLICATIONS

Website www.toolexperts.com/video-recording-rechargeable-flashlight-general-tools-torchscope.html Retrieved from the Internet on May 9, 2016, 5 pgs.
Website www.gearbest.com/action-cameras/pp_110751.html Retrieved from the Internet on May 9, 2016, 14 pgs.

\* cited by examiner

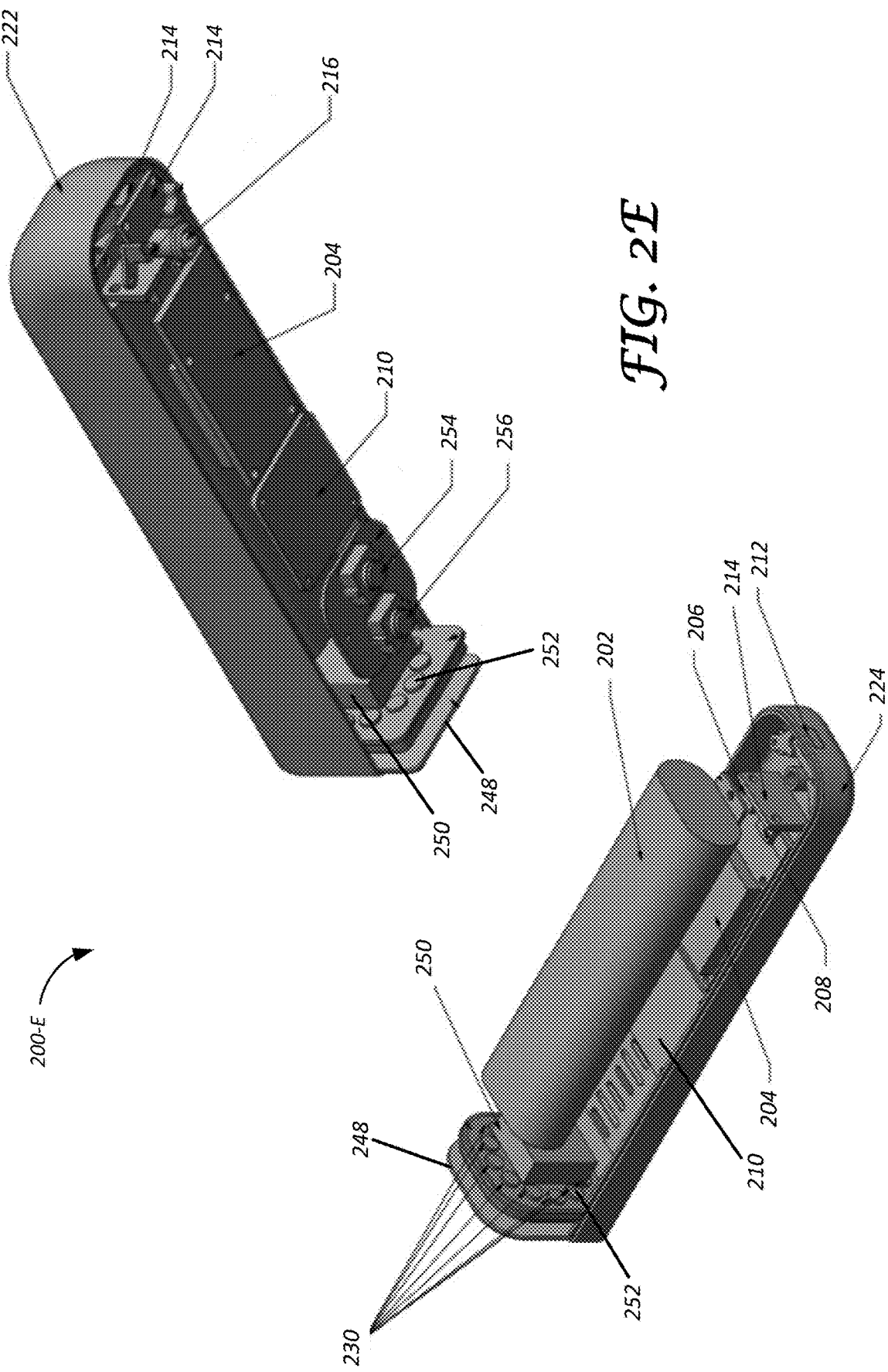

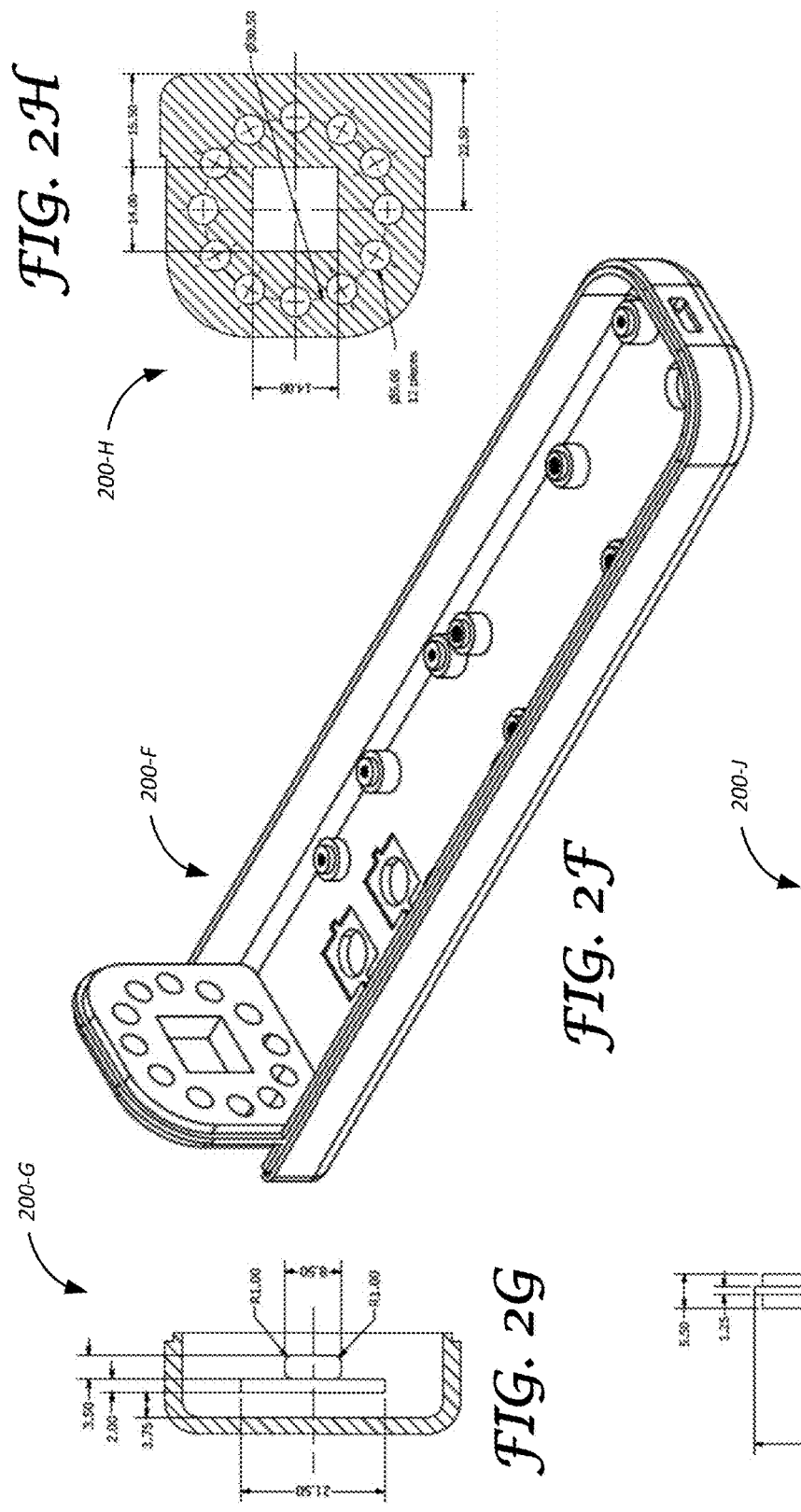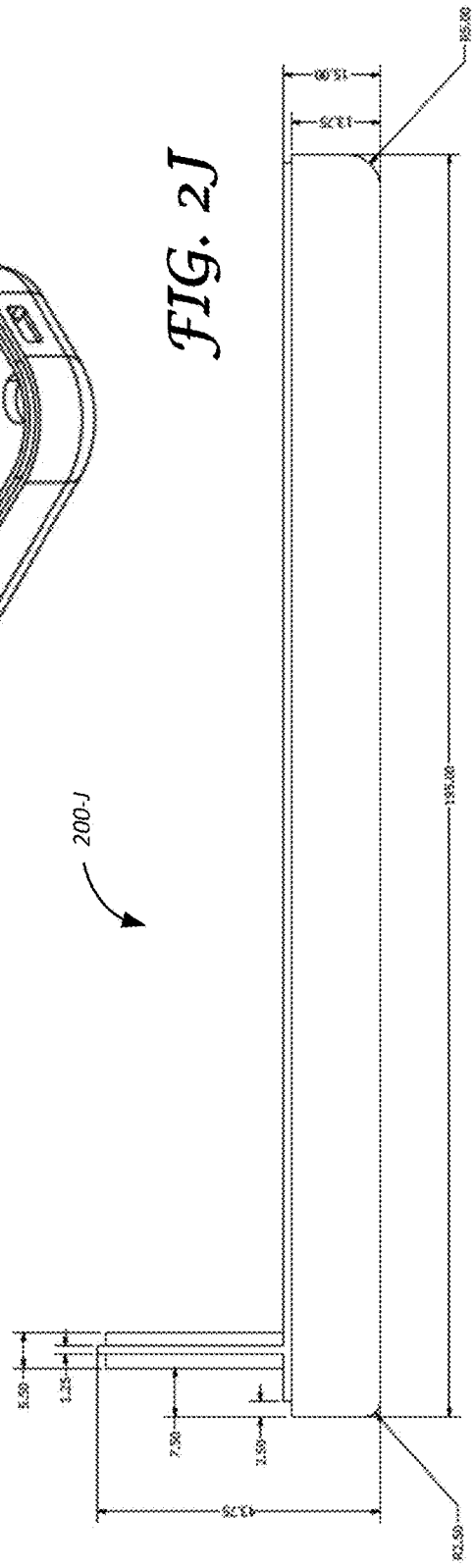

LIVE-STREAMING FLASHLIGHT CAMERA

REFERENCE TO RELATED APPLICATIONS

This application claims the benefit of U.S. provisional application Ser. No. 62/468,747 filed Mar. 8, 2017, the disclosure of which is hereby incorporated in its entirety by reference herein.

TECHNICAL FIELD

The present disclosure relates to systems and methods for capturing and sending images and/or video in real time via a wireless ad hoc network.

BACKGROUND

Performing electrical or mechanical repairs, conducting virtual training, or performing other tasks of a field service technician, mobile repairman, or an installation and troubleshooting specialist may require real time hands-on demonstrations that may be viewed by students and/or guided by experts over long distances and with a network reach to remote geographic areas. While electronic devices equipped with digital transceivers may be configured to exchange information, or communicate, using cellular communication, such communication may be limited in areas with few cellular network infrastructure elements.

SUMMARY

A live-streaming flashlight camera includes a camera adapted to capture an image of an object, a light source adapted to illuminate the object to be captured by the camera, a battery connected to provide power to the camera and light source, and a processor in communication with the light source and camera and configured to: establish an ad-hoc wireless network connection with a mobile host device, and livestream the image of the object to the mobile host device via the ad-hoc network connection.

A method of operating a live-streaming flashlight camera includes establishing, by a processor disposed in a housing of the live-streaming flashlight camera, an ad-hoc wireless network connection with a mobile host device, powering a light source and a camera disposed in the housing with a battery, capturing an image of an object with the camera disposed in the live-streaming flashlight camera, and livestreaming the image to the mobile host device via the ad-hoc wireless network connection.

BRIEF DESCRIPTION OF THE DRAWINGS

FIG. 2E illustrates an exploded view of the live streaming flashlight camera;

FIG. 2F illustrates a perspective view of a second portion of the live streaming flashlight camera;

FIGS. 2G-2L illustrate dimensional views of the second portion of the live streaming flashlight camera;

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Performing field work, such as automotive or manufacturing equipment repairs, in a geographic area with a poor cellular network connection may limit the ability of a repairman to communicate with known experts in their field to receive up-to-the-minute diagnostics guidance or advice. For example, the repairman working in an environment without a cellular network connection may observe an unusual diagnostic mode or have another reason to share their observations with their colleagues in real time.

The present application discloses a diagnostic, live-streaming flashlight camera device that allows a user to capture and send images and/or video in real time to a host device for further distribution to one or more contacts stored on the host device. In some examples, the host device may be configured to forward the received real-time images and/or videos to a server, such that one or more client devices in communication with the server may access the real-time images and/or video. In further examples, the real-time image and/or video may further be captured and stored on the host device for sharing with contacts later.

Figure 1:
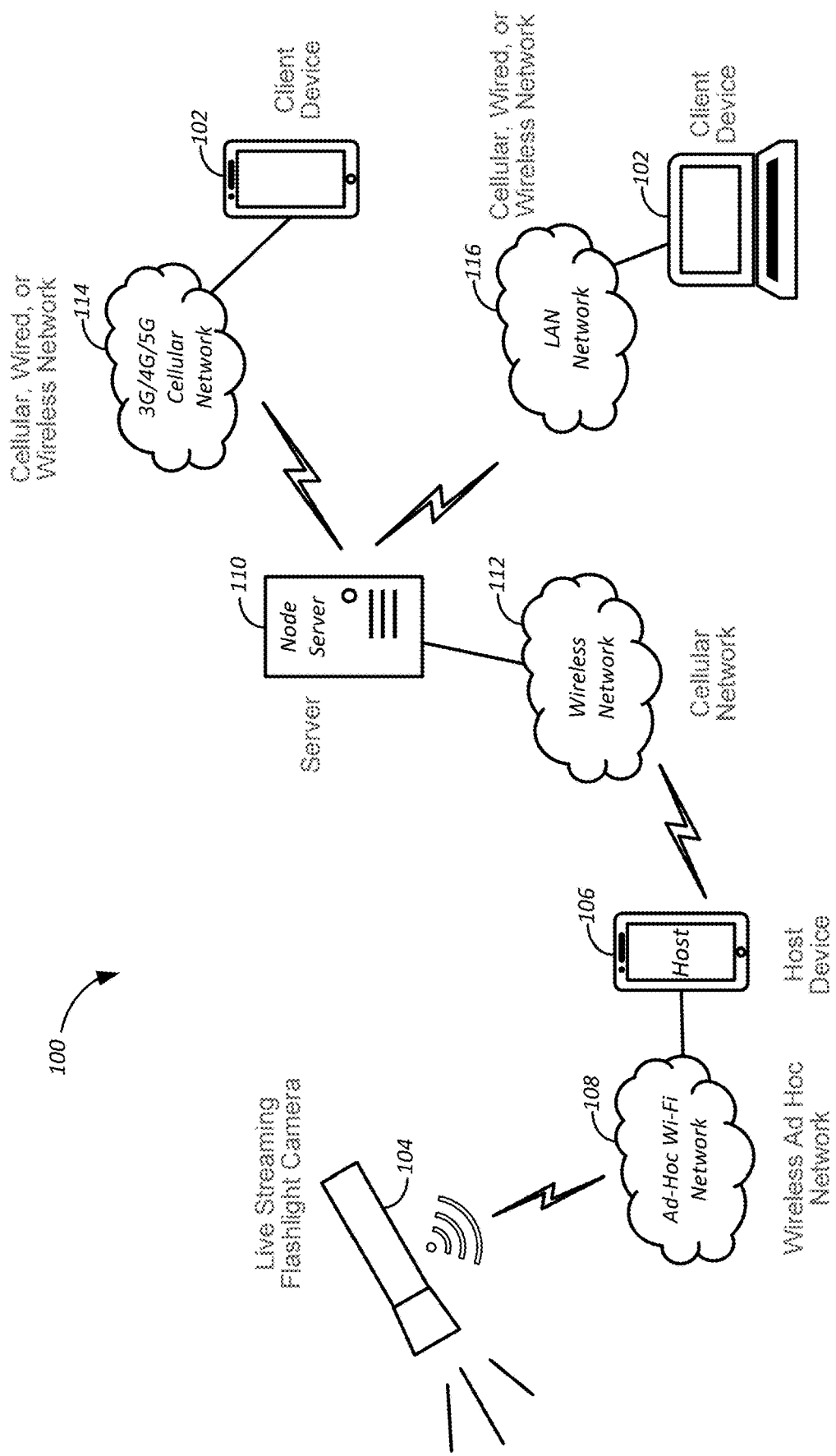
FIG. 1 is a block diagram of a live streaming flashlight camera system for capturing and sending image and/or video data for live streaming to user devices.

FIG. 1 illustrates an example live-streaming flashlight camera system 100 for capturing and sending real-time images and/or video to one or more user devices 102. The system 100 may include a live-streaming flashlight camera 104 comprising a light source and a camera and configured to broadcast images and/or video to the devices 102. The devices 102 may include client devices such as a mobile phone, tablet, laptop or a computer or any device configured to communicate and view the real time images and/or video. 'Live streaming' and 'real time' refer to the actual time during which a captured event occurs or within a short time delay, such as a few seconds or even within a few milliseconds, so that the images and/or video captured by the live-streaming flashlight camera 104 are transmitted as it happens and are available virtually immediately on the user devices.

In one example, the live-streaming flashlight camera 104 may be configured to send captured images to a host device 106 using a wireless ad-hoc network 108. The host device 106 may stream the images and/or video to a server 110 using a cellular network 112. The client devices 102 may connect to the server 110 using one or more cellular networks 114, wired/wireless networks 116, or other suitable connections. The client devices 102 connected to the server 110 may receive real time images and/or video captured and sent by the live-streaming flashlight camera 104.

FIGS. 2A, 2B, 2C, and 2D illustrate a front view 200-A, a side view 200-B, a bottom view 200-C, and a cross-sectional view 200-D, respectively, of an example live-streaming flashlight camera 200, such as the live streaming flashlight camera 104 described in reference to FIG. 1. The live-stream flashlight camera 200 may be configured to broadcast the stream to a server for further distribution to the one or more client devices 102. In one example, the live-streaming flashlight camera 200 may comprise of a housing 220 that forms the outer surface of the live-streaming flashlight camera 200 and is sized to be easily held by a user in one hand.

Figure 2A:
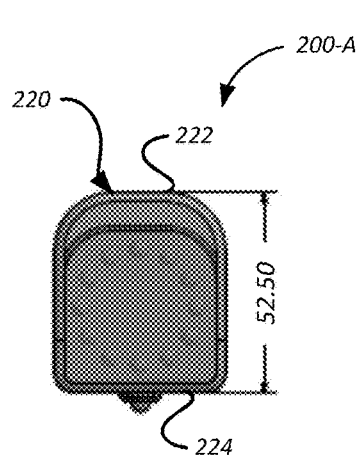
FIGS. 2A-2C illustrate dimensional views of the live streaming flashlight camera.
Figure 2B:
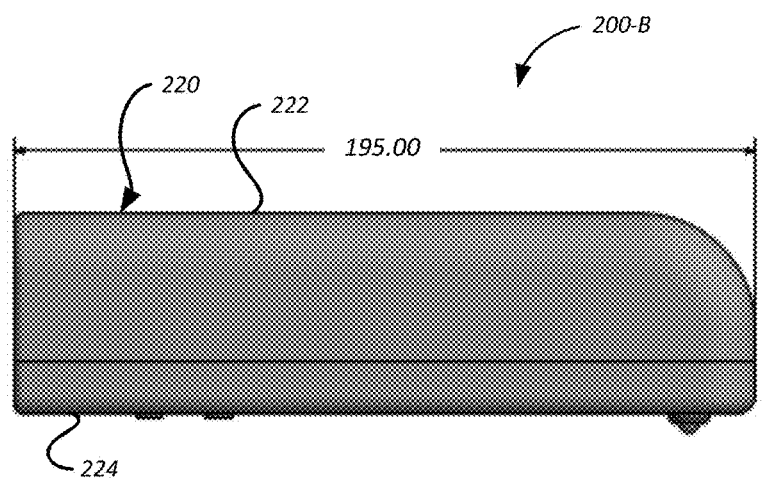
Figure 2C:
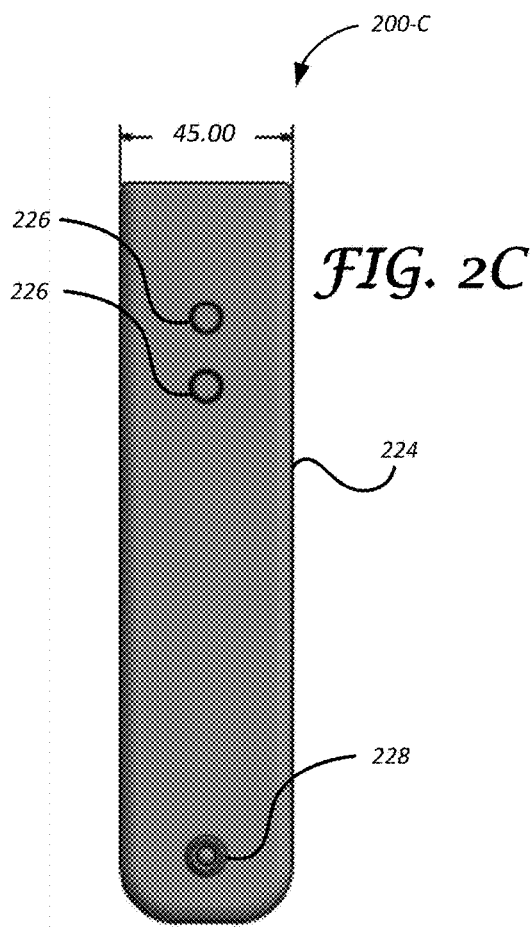
Figure 2D:
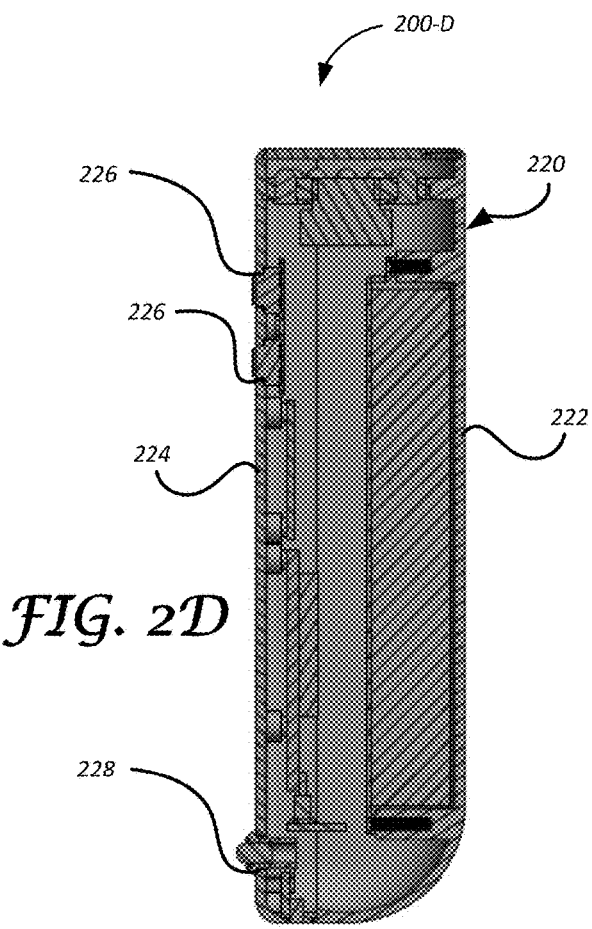
FIG. 2D illustrates a cross-sectional view of the live streaming flashlight camera.
Figure 2K:
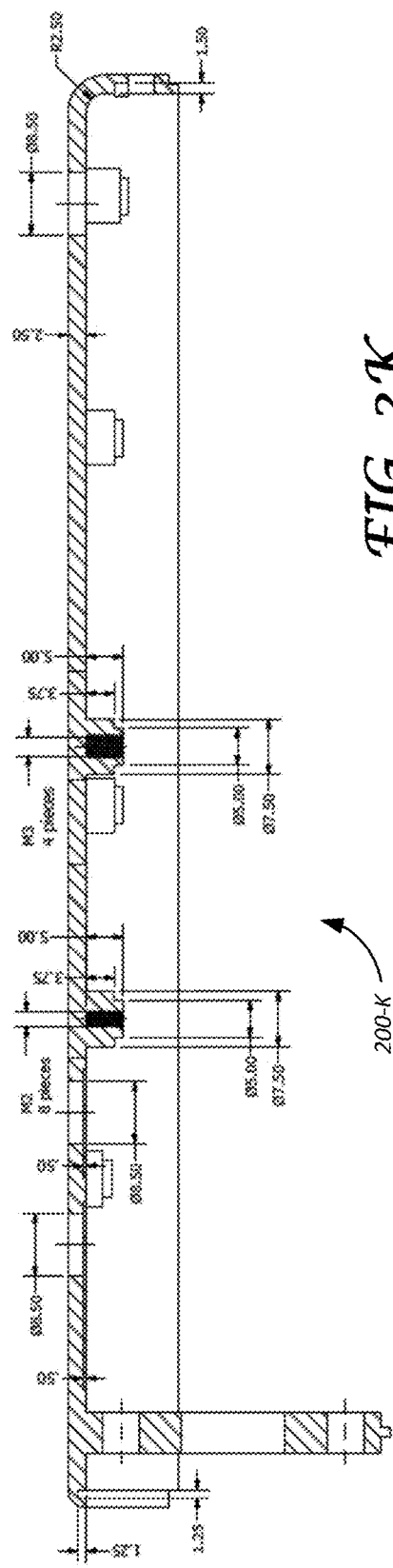
Figure 2L:
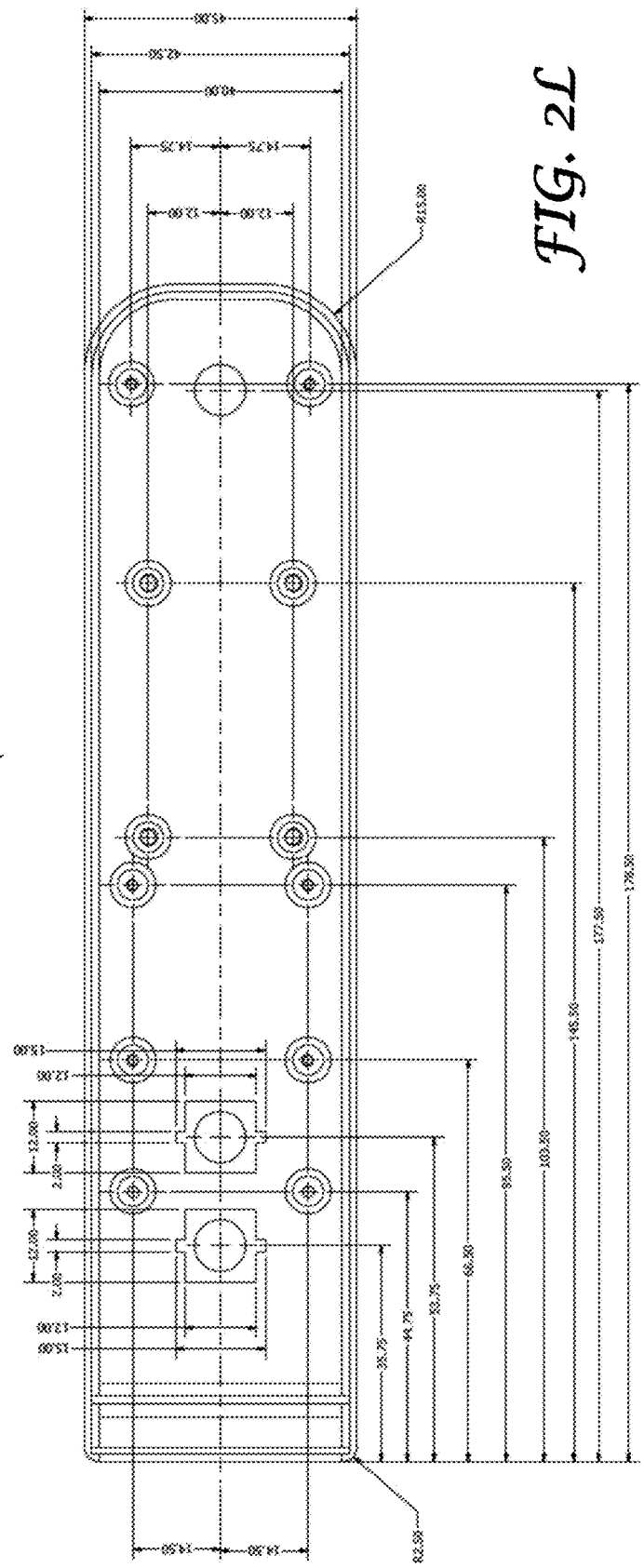

The housing 220 may further comprise of a first portion 222 and a second portion 224, the second portion 224 further defining a plurality of openings 226 sized to house one or more buttons and an opening 228 sized to house an indicator light such as a light-emitting diode (LED). Example dimensions for the live-streaming flashlight camera 200, as shown in the front, side, and bottom views 200-A through 200-C, respectively, may be a height of fifty-two and a half (52.5) millimeters, a length of one hundred and ninety-five (195) millimeters, and a width of forty-five (45) millimeters. A perspective view 200-F of the second portion 224 is shown in FIG. 2F. Moreover, example dimensions of the second portion 224 are referenced in end views 200-G and 200-H, side view 200-J, cross-sectional view 200-K, and top view 200-L of the second portion 224 as shown in at least FIGS. 2G-2L. Nevertheless, the housing 220 including fewer or more portions defining different dimensions, proportions, and geometric shapes than those described in at least FIGS. 2A-2L, are also contemplated.

FIG. 2E illustrates an exploded view 200-D of the live-streaming flashlight camera 200 with the portions 222, 224 of the housing 220 set apart. The live-streaming flashlight camera 200 is configured to generate a live stream from the images and/or video captured by a camera 250. The housing 220 contains the camera 250 and a light source 252 mounted adjacent a lens or transparent cover 248 that forms one end of the housing 220.

The light source 252 may, for instance, comprise of one or more bulbs, LEDs, or other implements configured to generate and emit light and illuminate an object to be captured by the camera 250. As shown in the FIG. 2A-2D, the light source 252 may include twelve LEDs 230 arranged in a radial array. As shown, the LEDs 230 form a circle that has a diameter greater than a width of the camera 250 and/or greater than a lens of the camera. A light source switch 254 may be a push-button switch electrically connected to the light source 252 and may allow a selective enabling and disabling of the light source 252. The light source switch 254 may also be a capacitive switch or any other suitable selection switch or device.

The camera 250 may be an image-capture device, such as a device comprising of a fixed- or an adjustable-focus lens and an image sensor, e.g., a complimentary metal-oxide-semiconductor (CMOS)-based sensor, a charge-coupled device (CCD) configured to convert electrical charge into a digital value, and so on. A camera switch 256 may be a push-button switch configured to enable and disable power flow and/or to enable image or video recording modes to the camera 250. The camera switch 256 may also be a capacitive switch or any other suitable selection switch or device. In some examples, the live-streaming flashlight camera 200 may include a camera status indicator 216, or an LED that indicates one or more operating modes of the camera 250. The operating modes of the camera 250 may include, for instance, enabled, disabled, and active recording operating modes.

The light source 252 and the camera 250 may be powered by a battery 202 mounted in the housing 220, such as, but not limited to, a lithium-ion battery. In one example, the battery 202 may be a rechargeable battery configured to receive electric charge using a battery charger 210 accessible via a charge port 212 by way of charger electronics 214. The battery charger 210 may be further configured to distribute energy supplied by the battery 202 to other components of the live streaming flashlight camera 200.

The live-streaming flashlight camera 200 may include a processor 204, a storage device 206, and voltage regulator 208. The processor 204 may comprise of a microprocessor including a single core or a multiple-core central processing unit (CPU) that enables collecting data from the image sensor of the camera 250. The processor 204 may, for example, be configured to execute firmware or software programs (or instructions) stored on the storage device 206.

The storage device 206 of the live-streaming flashlight camera 200 may be configured to store instructions for execution by the processor 204 and, as some examples, may include volatile or non-volatile storage device types, such as, but not limited to, dynamic random-access memory (DRAM), double data rate synchronous DRAM (SDRAM), static RAM (SRAM), thyristor RAM (T-RAM), zero-capacitor (Z-RAM), read-only memory (ROM), mask ROM, programmable ROM (PROM), erasable PROM (EPROM), electrically erasable PROM (EEPROM), non-volatile RAM (NVRAM), flash memory, solid-state storage, and so on.

One or more voltage regulators, such as, for example, the voltage regulator 208, may be configured to ensure voltage output by the battery 202 is within a predefined voltage range. The voltage regulators may be further configured to convert voltage to a voltage level compatible with one or more electrical components of the live streaming flashlight camera 200.

The processor 204 may be further configured to establish a wireless connection using one or more communication protocols, such as, but not limited to, IEEE 802, Bluetooth Low Energy (LE), and so on. In one example, the processor 204 may be configured to communicate with the host device 106 via the wireless ad hoc network 108. The processor 204 may use the wireless ad hoc network 108 to live stream images and/or video captured by the camera 250 to the host device 106.

Figure 3:
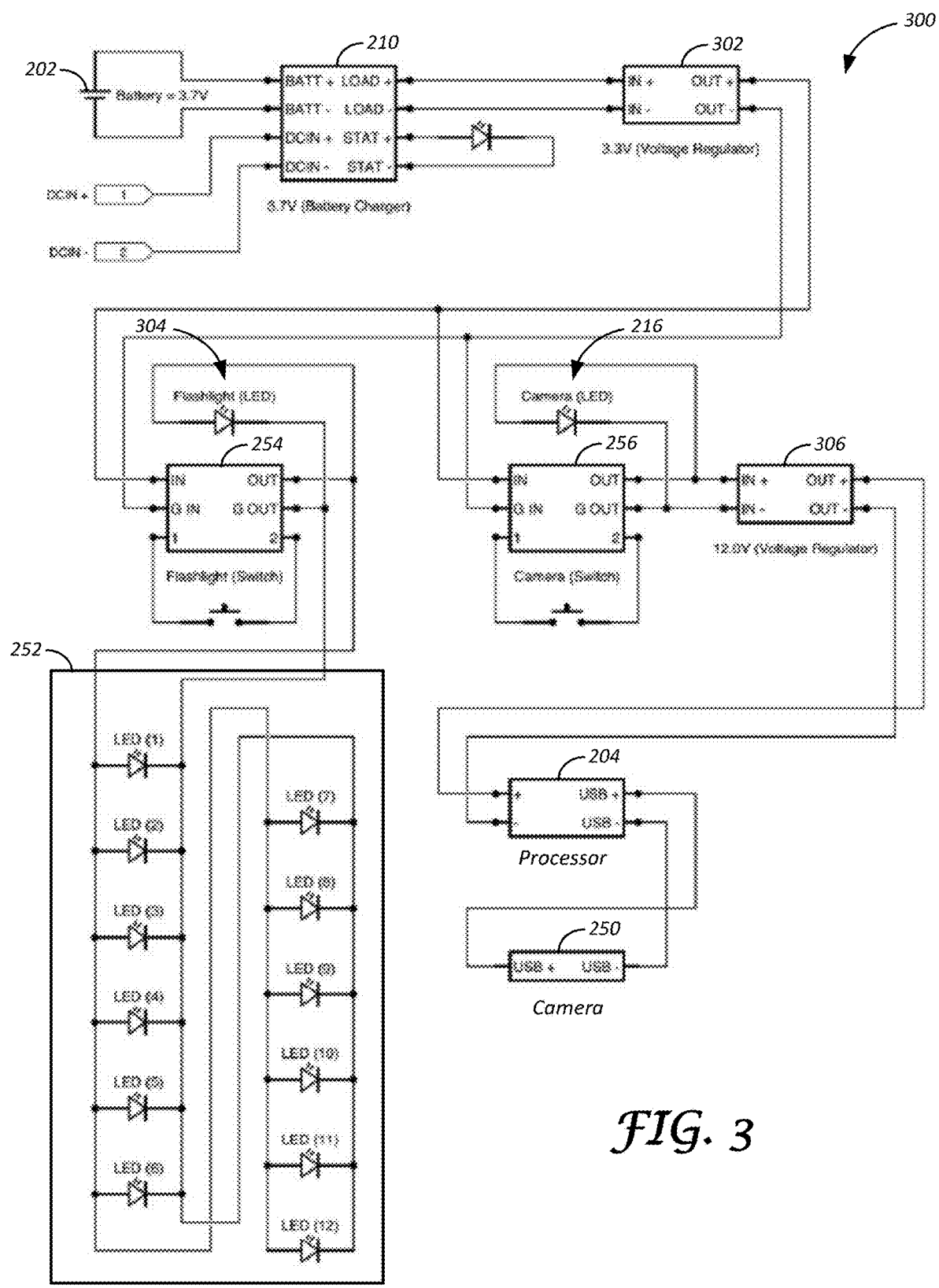
FIG. 3 is a circuit diagram illustrating electrical and electronic components of the live streaming flashlight camera.

FIG. 3 illustrates an example circuit diagram 300 for a live-streaming flashlight camera, such as the live streaming flashlight camera 200 described in reference to FIG. 2 and the live streaming flashlight camera 104 described in reference to FIG. 1. The battery charger 210 connected to the battery 202 may include a status LED configured to indicate one or more operating modes associated with the battery 202. In some examples, the operating modes of the battery 202 may include, low charge status, full charge status, currently charging and so on.

The battery charger 210 and a battery voltage regulator 302 supply energy generated by the battery 202 to the light source 252, the camera 250, and one or more electronic components associated with the live-streaming flashlight camera 104. In one example, the light source switch 254 connected between the battery 202 and the light source 252 is configured to selectively enable and disable power flow to the light source 252. The light source switch 254 may include a light source status indicator 304 configured to indicate one or more operating modes of the light source 252, such as, but not limited to, enabled and disabled.

The camera switch 256 connected between the camera 250 and the battery 202 allows enabling and disabling a supply of battery power to the camera 250. The camera status indicator 216 of the camera switch 256 may indicate one or more operating modes associated with the camera 250. A camera voltage regulator 306 may be configured to condition battery power supplied to the processor 204 connected to the camera 250. In one example, the camera voltage regulator 306 may be configured to convert battery 202 output power to a voltage level compatible with the processor 204 and the camera 250. As described in further detail in reference to FIG. 4, the processor 204 may be configured to receive images and/or video captured by the camera 250. The processor 204 may be further configured to live stream the captured images and/or video to the host device 106 via the wireless ad hoc network 108 connection.

Figure 4:
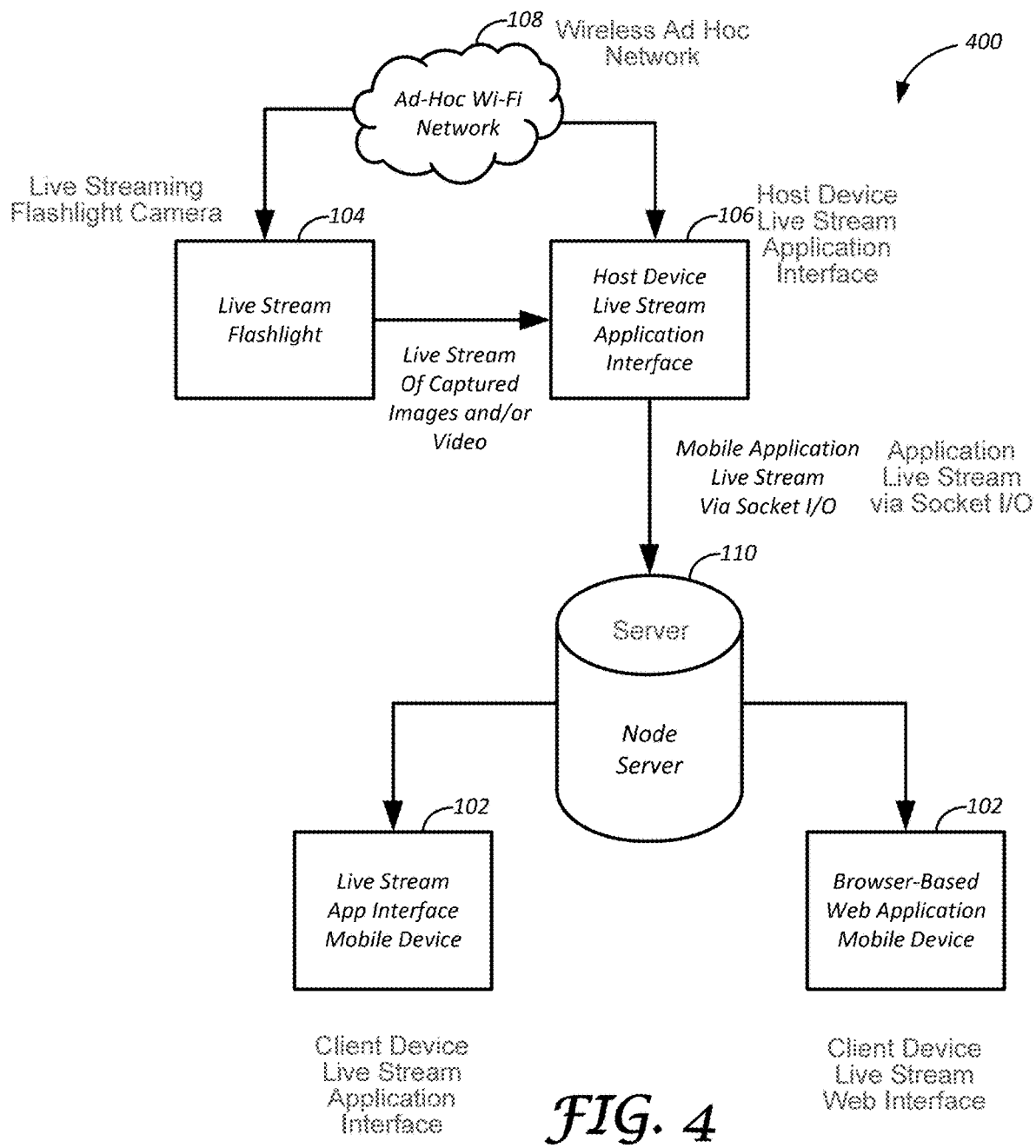
FIG. 4 is a block diagram illustrating network topology of the live streaming flashlight camera system.

FIG. 4 illustrates a live streaming flashlight camera network topology diagram 400 for live streaming images and/or video captured by the live streaming flashlight camera 104 to the client devices 102. The host device 106 may include a processor (not shown) configured to execute instructions for installation of a software application. The host device 106 may, accordingly, initiate a wireless network connection with the live streaming flashlight camera 104 in response to installing the software application. In one example, the host device 106 may be equipped with a wireless network transmitter (not shown) configured to broadcast a signal indicative of a request to establish a wireless network connection via the wireless ad hoc network 108.

The wireless ad-hoc network 108 between the live-streaming flashlight camera 104 and the host device 106 may comprise of a wireless network connection between a first node (the live streaming flashlight camera 104) and a second node (the host device 106) formed without any device serving as a centralized administrative device. Each of the pair of nodes, that is the live-streaming flashlight camera 104 and the host device 106, may, accordingly, fulfill functions of hosting the captured image and/or video data, as well as, routing, or distributing, the image and/or video data to one or more client devices 102. The wireless ad-hoc network 108 may be a single-hop, multi-hop, flat, hierarchical, aggregate, homogeneous, or a heterogeneous ad hoc network or a network comprising some combination thereof.

The wireless ad-hoc network 108 may be configured to operate using one or more ad-hoc routing protocols, such as, but not limited to, on-demand, table driven, or hybrid ad-hoc routing protocols, including protocols utilizing hop count, link-state, quality of service (QoS) routing, and so on. As some examples, the ad-hoc routing protocols include, among others, ad hoc on-demand distance vector (AODV), dynamic source routing (DSR), Temporally-Ordered Routing Algorithm (TORA) Associativity Base Routing (ABR), Stability based Adaptive (SSA), optimized link state routing (OLSR), destination sequenced distance vector Clustered Gateway Switch Routing (CGSR), Wireless Routing Protocol (WRP), zone routing protocol (ZRP), Zone-Based Hierarchical Link State (ZHLS), and core extraction distributed ad hoc routing (CEDAR).

In response to receiving a signal from the host device 106 indicative of a request to establish a wireless ad-hoc connection, the processor 204 of the live-streaming flashlight camera 104 may execute instructions to assign a corresponding Internet protocol (IP) address to the host device 106 that is connected to its wireless ad hoc network 108. The assigned IP address may indicate a server location where the live stream of captured images and/or video generated by the live streaming flashlight camera 104 may be found. Using the assigned IP address to access the live stream generated by the live streaming flashlight camera 104 may, in some instances, eliminate a necessity to access the live stream by entering a static IP address on a certain domain name system (DNS) on the host device 106.

The live-streaming flashlight camera 104 may begin to live stream images and/or video captured by the camera 250 in response to detecting that the camera 250 has been enabled, e.g., via a signal from the camera switch 256. In one example, the processor 204 of the live-streaming flashlight camera 104 may be configured to broadcast images and/or video captured by the camera 250 in response to receiving a signal from the camera 250 sensor indicating that an image and/or video has been captured. The live-streaming flashlight camera 104 may, accordingly, live stream captured images and/or video within a short period of time following enabling of the camera 250. In some instances, the livestream generated by the live-streaming flashlight camera 104 and transmitted to the host device 106 may be available for viewing via a connection to the server 110 within 10 seconds following closing of the camera switch 256.

The live-streaming flashlight camera 104 may be configured to compress the image and/or video data captured by the camera 250. The processor 204 of the live streaming flashlight camera 104 may, for instance, compress the captured image and/or video data using motion joint photographic experts group (MJPEG) video compression format prior to sending, to the host device 106, a sequence of JPEG frames over a hypertext transfer protocol (HTTP) session.

In on example, the wireless ad hoc network 108 connection between the live-streaming flashlight camera 104 and the host device 106 may be password-protected, such that a user of the host device 106 may be required to enter a previously agreed upon password in order to access and control the connection to the live streaming flashlight camera 104.

The host device 106 may be configured to send the live stream of image and/or video data received from the live streaming flashlight camera 104 to the server 110. In one example, the host device 106 may be configured to execute instructions for creating a server, e.g., the server 110, configured to display live streaming image and/or video data generated by the live streaming flashlight camera 104. The server 110 may, accordingly, be an HTTP server including a server port and configured to output predefined digital content in response to receiving a corresponding request from the client devices 102.

The client devices 102 may be configured to connect to the server 110 using a variety of wired or wireless network connections. In one example, the client devices 102 may be configured to send a signal to the server port associated with the server 110, the signal indicating a request to display a live stream of image and/or video data captured by the camera 250. As some examples, the server 110 may be an HTTP server and the client devices 102 may be configured to use hypertext markup language (HTML) to communicate with the server 110 via a web browser window.

As some other examples, the client devices 102 may be configured to communicate with the server 110 using a multimedia player application, such as, but not limited to, QuickTime™ or VideoLAN Client (VLC) media player. Put another way, the client devices 102 may be configured to access the live stream of captured images and/or video generated by the live streaming flashlight camera 104 using one or more media playback applications.

As still other examples, the client devices 102 may be configured to access the live stream generated by the live streaming flashlight camera 104 by referencing an image and/or video tag that was associated with the live stream by the host device 106.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A live-streaming flashlight camera comprising:
    a camera to capture an image of an object;
    a light source to illuminate the object to be captured by the camera;
    a battery connected to provide power to the camera and light source;
    a processor in communication with the light source and camera and configured to:
        establish an ad-hoc wireless network connection with a mobile host device, and
        livestream the image of the object to the mobile host device via the ad-hoc network connection; and
    an elongated housing defining a cavity sized to house the camera, the light source, the battery, and the processor therein, the housing having an end opening through which the camera captures the image of the object and the light source illuminates the object, wherein the elongated housing has a cross-section being substantially the same as the end opening along a length of the housing.

2. The live-streaming flashlight camera of claim 1, wherein the light source comprises a plurality of light elements arranged in a circular array defining a center aperture through which the camera captures the image.

3. The live-streaming flashlight camera of claim 2, wherein the light source is disposed proximate to an end opening defined about a first end of the housing such that light generated by the light source is directed outward through the opening and away from the cavity.

4. The live-streaming flashlight camera of claim 3, wherein the camera comprises a lens facing outward through the center aperture and the end opening and substantially co-directional with the light source.

5. The live-streaming flashlight camera of claim 2, wherein the plurality of light elements comprises twelve light-emitting diodes (LEDs).

6. The live-streaming flashlight camera of claim 1, wherein the processor is further configured to assign an internet protocol (IP) address to the mobile host device in response to a request to establish the ad-hoc wireless network connection.

7. The live-streaming flashlight camera of claim 1, wherein the processor establishes the ad-hoc wireless network connection to communicate with the mobile host device without a cellular network.

8. The live-streaming flashlight camera of claim 1, wherein the housing defines a plurality of button openings and at least one of the button openings is sized to house a camera status LED electrically connected with and controlled by the processor, wherein at least one of the button openings is sized to house a flashlight switch button electrically connected to the light source to selectively turn on and turn off the light source when pressed and at least one of the button openings is sized to house a camera switch button electrically connected to the processor, and wherein the processor is further configured to selectively turn on and off the camera status LED and the camera at a same time when the camera switch button is pressed.

9. The live-streaming flashlight camera of claim 1, wherein the width and height of the end opening is less than fifty-five millimeters.

10. A method of operating a live-streaming flashlight camera comprising:
    providing an elongated housing defining a cavity sized to house a camera, a light source, a battery, and a processor therein, wherein the elongated housing has a cross-section being substantially the same as an end opening along a length of the housing;
    establishing, by the processor, an ad-hoc wireless network connection with a mobile host device;
    illuminating an object with the light source through the end opening in the elongated housing;
    capturing an image of the object with the camera through the end opening in the elongated housing; and
    livestreaming the image to the mobile host device via the ad-hoc wireless network connection.

11. The method of claim 10 further comprising assigning an internet protocol (IP) address to the mobile host device in response to a request to establish the ad-hoc wireless network connection.

12. The method of claim 11, wherein the IP address includes a server location address where the captured image is stored.

13. The method of claim 10, wherein the livestreaming comprises sending a sequence of a plurality of the captured images using a previously established hypertext transfer protocol (HTTP).

14. The method of claim 13, wherein livestreaming comprises, prior to sending, compressing the plurality of the captured images using a motion joint photographic experts group (MJPEG) video compression format.

15. The method of claim 10, wherein the light source comprises a plurality of light elements arranged in a circular array defining a center aperture through which the camera captures the image.

16. The method of claim 15, wherein the plurality of light elements comprises twelve light-emitting diodes (LEDs).

17. The method of claim 10, wherein the establishing of the ad-hoc wireless network connection comprises communicating with the mobile host device without a cellular network.

18. The method of claim 10, wherein establishing of the ad-hoc wireless network connection comprises communicating with the mobile host device without any centralized administrative device.

19. The method of claim 10, further comprising providing instructions to the mobile host device to create a server configured to output live stream data to a client device.

20. A live-streaming flashlight camera comprising:
a camera to capture an image of an object;
a light source to illuminate the object to be captured by the camera;
a battery connected to provide power to the camera and light source;
a processor in communication with the light source and camera and configured to:
establish an ad-hoc wireless network connection with a mobile host device, and
livestream the image of the object to the mobile host device via the ad-hoc network connection; and
an elongated housing defining a cavity sized to house the camera, the light source, the battery, and the processor therein, wherein the width and height of an end opening is less than fifty-five millimeters, and wherein the elongated housing has a cross-section being substantially the same as the end opening along a length of the housing.

* * * * *